(12) United States Patent
Couderq (10) Patent No.: US 11,864,110 B2
(45) Date of Patent: Jan. 2, 2024

(54) MONITORING USER EQUIPMENT ENERGY CONSUMPTION

(71) Applicant: NOKIA TECHNOLOGIES OY, Espoo (FI)

(72) Inventor: Bertrand Couderq, Nozay (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/961,558

(22) PCT Filed: Jan. 16, 2018

(86) PCT No.: PCT/EP2018/051014
§ 371 (c)(1),
(2) Date: Jul. 10, 2020

(87) PCT Pub. No.: WO2019/141350
PCT Pub. Date: Jul. 25, 2019

(65) Prior Publication Data
US 2020/0344689 A1      Oct. 29, 2020

(51) Int. Cl.
*H04W 52/02*      (2009.01)
*H04B 17/318*    (2015.01)

(52) U.S. Cl.
CPC ...... *H04W 52/0229* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 2008/0049620 A1 | 2/2008 | Riga et al. | |
| 2012/0224552 A1* | 9/2012 | Feuersanger | H04W 52/146 370/329 |
| 2013/0065596 A1 | 3/2013 | Frederiksen et al. | |

(Continued)

FOREIGN PATENT DOCUMENTS

| | | |
|---|---|---|
| CN | 102177753 A | 9/2011 |
| CN | 105338555 A | 2/2016 |

(Continued)

OTHER PUBLICATIONS

International Search Report and Written Opinion dated Oct. 1, 2018 corresponding to International Patent Application No. PCT/EP2018/051014.

(Continued)

*Primary Examiner* — Adolf DSouza
(74) *Attorney, Agent, or Firm* — SQUIRE PATTON BOGGS (US) LLP (57) ABSTRACT

There is provided a method and an apparatus for performing the method, the method comprising: obtaining a path loss estimation based on a received signal strength of a first transmission, transmitted by a user equipment, and a transmission energy information element comprised in the first transmission; determining a transmission energy estimation regarding a second transmission based on the path loss estimation and a received signal strength of the second transmission; and controlling one or more energy counters regarding the user equipment based on the transmission energy estimation regarding the second transmission.

25 Claims, 6 Drawing Sheets

(56) References Cited

U.S. PATENT DOCUMENTS

2015/0173103 A1    6/2015  Lunden et al.
2015/0334653 A1  11/2015  Ang et al.
2015/0358920 A1  12/2015  Sorrentino et al.
2018/0368081 A1* 12/2018  Akkarakaran ...... H04W 52/242

FOREIGN PATENT DOCUMENTS

| EP | 2 813 112 A1 | 12/2014 |
| KR | 100728633 B1 | 6/2007 |
| WO | 2013/025014 A2 | 2/2013 |
| WO | 2015042459 A1 | 3/2015 |
| WO | WO 2016/173676 A1 | 11/2016 |
| WO | 2017/165668 A1 | 9/2017 |

OTHER PUBLICATIONS

First Examination Report issued in corresponding Indian Patent Application No. 202047034387 dated Sep. 10, 2021.
First Office Action dated Dec. 23, 2022 corresponding to Chinese Patent Application No. 201880090365.4, with Search Report.
Second Office Action dated Jul. 31, 2023 issued in corresponding Chinese Patent Application No. 201880090365.4, with English language summary thereof.

* cited by examiner

MONITORING USER EQUIPMENT ENERGY CONSUMPTION

TECHNICAL FIELD

The invention relates to communications.

BACKGROUND

In a communication network, user equipment normally comprises an integrated power source, such as a battery, for providing power to perform various tasks. For example, transmitting data requires power. Hence, it may be beneficial to provide solutions which enhance the monitoring of user equipment's energy consumption. Such information may be beneficial, for example, in determining solutions for prolonging user equipment operation time.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth (e.g. Bluetooth Low Energy), personal communications services (PCS), ZigBee, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
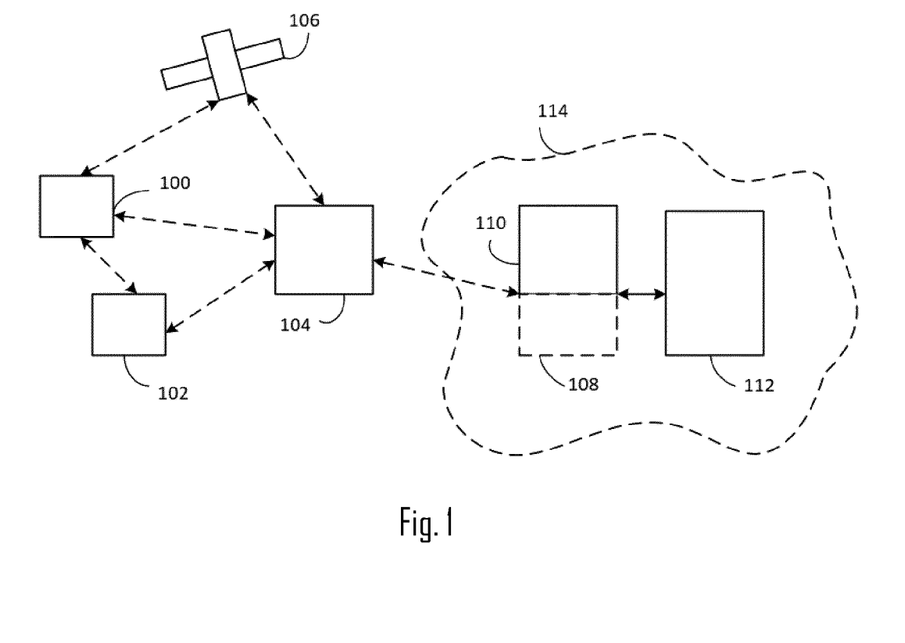
FIG. 1 illustrates an example a wireless communication system to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties.

The example of FIG. 1 shows a part of an exemplifying radio access network. Referring to FIG. 1, user devices 100 and 102 may be configured to be in a wireless connection on one or more communication channels in a cell with an access node, such as (e/g)NodeB, 104 providing the cell. The physical link from a user device to the access node 104 is called uplink or reverse link and the physical link from the access node 104 to the user device is called downlink or forward link. It should be appreciated that access node 104 or nodes or their functionalities may be implemented by using any node, host, server or access point etc. entity suitable for such a usage. The term (e/g)NodeB used above may refer to eNodeB (i.e. eNB) and/or gNodeB (i.e. gNB), for example.

A communications system typically comprises more than one access node (e.g. similar as access node 104) in which case the access nodes may also be configured to communicate with one another over links, wired or wireless, designed for the purpose. These links may be used for signaling purposes. The access node may be a computing device configured to control the radio resources of communication system it is coupled to. Access node, such as the access node 104, may also be referred to as a base station, an access point, network node, network element or any other type of interfacing device including a relay station capable of operating in a wireless environment. Access node includes or is coupled to transceivers. From the transceivers of the access node, a connection is provided to an antenna unit that establishes bi-directional radio links to user devices. The antenna unit may comprise a plurality of antennas or antenna elements. The access node 104 is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, and Machine Type Communication (MTC) device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices 100, 102 are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes, such as (e/gNodeBs), the user device may have an access to a plurality of radio cells and the system may comprise also other apparatuses, such as physical layer relay nodes or other network elements, etc. At least one of the access nodes may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The access nodes of FIG. 1 may provide any kind of these cells. A cellular radio system may be implemented as a multilayer network including several kinds of cells. Typically, in multilayer networks, one access node provides one kind of a cell or cells, and thus a plurality of access nodes are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In general, power source, such as a battery, is a critical resource of UE. It may therefore be beneficial to gain a good understanding on how much power the network topology, settings or features drain energy from that power source. For example, the operators may use this information to enhance their services so that battery life of UEs is increased. For example, in the context of Internet Of Thing (IOT), it is beneficial if UEs (e.g. CAT-M, Narrowband (NB)-IOT) consume as little energy as possible to have extended battery life. Therefore, there is provided a solution for wireless communication system (e.g. cellular systems, such as 4G or 5G) to monitor UE energy consumption. It is noted that other features than transmissions may consume energy (e.g. display, sound generation etc.). However, uplink transmissions may be require a quite large portion of UEs battery, i.e. transmitting may require more energy than receiving. Energy consumption may be directly proportional or linked to UEs battery consumption. Energy consumption may sometimes be referred to as power consumption. For example, the energy consumption information may be used to determine that one or more UEs consume their battery extensively and some corrective measure or action may be taken in response.

Figure 2:
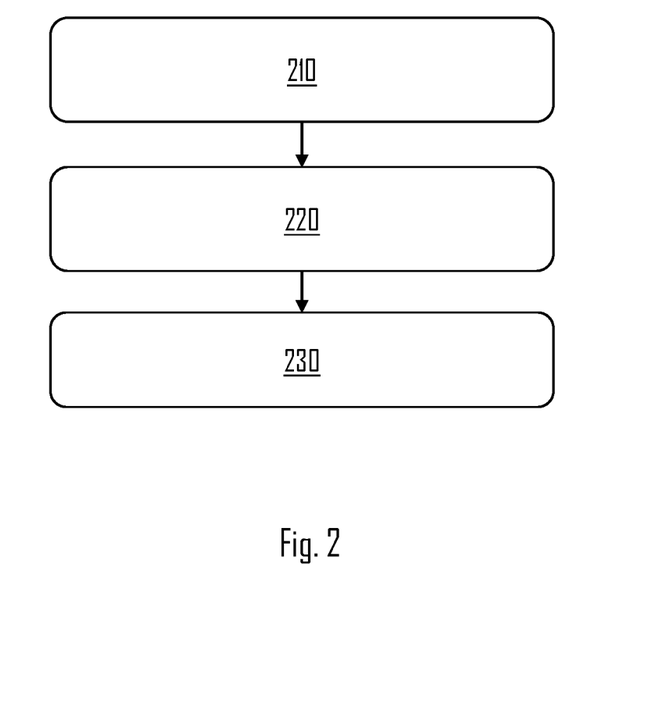
FIG. 2 illustrates a flow diagram according to an embodiment.

FIG. 2 illustrates an embodiment. Referring to FIG. 2, a method comprises: obtaining a path loss estimation based on a received signal strength of a first transmission, transmitted by a user equipment, and a transmission energy information element comprised in the first transmission (block 210); determining a transmission energy estimation regarding a second transmission based on the path loss estimation and a received signal strength of the second transmission (block 220); and controlling one or more energy counters regarding the user equipment based on the transmission energy estimation regarding the second transmission (block 230).

According to an embodiment, the method is performed by a network element, such as the network element 104. The user equipment or UE may be one of the UEs 100, 102, for example. Basically, the network element 104 may obtain path loss estimation regarding one or more UEs. For example, the path loss estimation may be UE specific, meaning, for example, that the path loss estimation may be individually determined for each UE. Hence, the energy counter(s) may also be UE specific. Thus, the network element 104 may determine energy consumption and update/control energy counter(s) regarding one or more UEs, wherein the energy consumption may determine per UE and energy counter(s) may be UE specific. According to an embodiment, the information of the one or more energy counters is outputted. For example, the outputting may be performed via user interface and/or comprise storing the information in a database or used to determine an action to be performed.

Figure 3A:
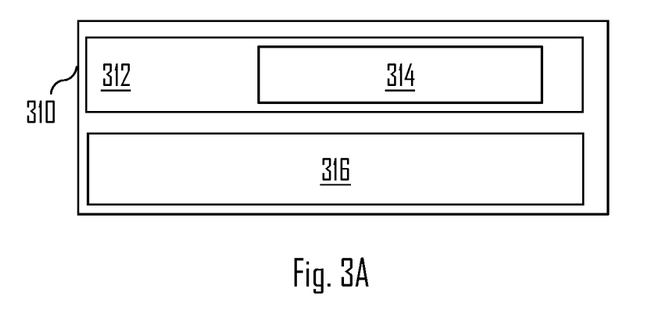
FIGS. 3A and 3B show examples of transmissions according to some embodiments.
Figure 3B:
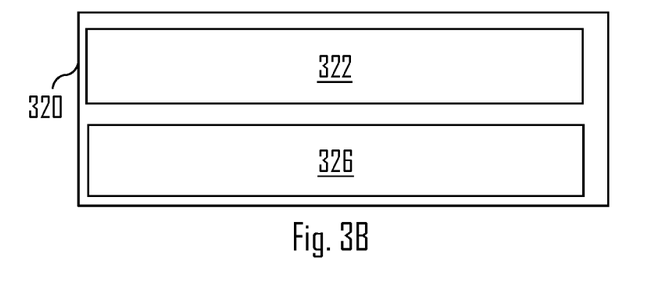

FIGS. 3A and 3B illustrate some embodiments. Referring to FIGS. 3A and 3B, a transmission 310 (referred to as first transmission 310) and transmission 320 (referred to as second transmission 320) are depicted. A transmission in the context of this disclosure may refer to a message that is transmitted via air-interface from UE to a network element (e.g. from UE 100, 102 to network element 104). Said transmission may comprise one or more frames and/or packets, such as Media Access Layer (MAC) packet (e.g. MAC protocol data unit (PDU) or Control Element (CE)), Physical Uplink Shared Channel (PUSCH) frame, Physical Uplink Control Channel (PUCCH) frame, for example. For example the transmission may comprise Sounding Reference Signal (SRS) transmission. However, the transmission may not be limited to these examples.

Referring to FIG. 3A, the first transmission may comprise a transmission energy information element (IE) 314. For example, the transmission energy IE 314 may be comprised in a header 312 of the first transmission. For example, the first transmission may in such case be MAC packet (e.g. MAC PDU or CE) comprising the header 312 which carries the transmission energy IE 314. The transmission energy IE 314 may indicate the transmission energy (e.g. transmission power) used by the transmitter to transmit said transmission. So, in short, the UE may generate the MAC packet so that it comprises transmission power which is/was used to transmit that MAC packet. So, the receiving entity (e.g. the network element 104) may then determine, based on the IE 314, the transmission energy used by the UE to transmit the first transmission. Additionally, the first transmission may comprise payload 316. However, this may not be necessary.

According to an embodiment, the transmission energy IE 314 is and/or comprises Power Head Room (PHR) element. The PHR element may be used with MAC packets to indicate, by the transmitter, the transmission power of that MAC packet. As indicated above, the uplink is may be a large consumer of battery as the UE needs power to send toward the network more than to just process downlink frames for instance. Power consumption may be tracked by using the power headroom counters. Power Headroom counters are based on the MAC CE included in the mac header of the PUSCH frame coming in uplink from the UE. These MAC CEs may indicate, for example, how much power is remaining in power ratio in decibels (dBm) to the UE against its max power limit (e.g. 23 dBm) while sending the current PUSCH frame. If the power headroom counter (e.g. maintained or controlled by the network based on MAC CE information) shows a decrease following an upgrade or feature activation or whatever network change, the operator may start thinking that the network is less efficient in preserving the end user equipment battery life. However, utilizing only the power headroom may give a very partial view of the UE power consumption for the following reasons: it does not keep track of the PUCCH sending and it does not keep track of the SRS sending (sending the SRS can take a lot of energy depending on the amount of bandwidth over which it is sent). Also it may not render a "power efficiency" that would show (everything else being equal) the interest (in throughput) of sending at higher power. Typically for sending a certain amount of data, the UE may: (1) use one Transmission Time Interval (TTI) with a higher Modulation and Coding Scheme (MCS) and more power to increase probability that the packet will reach the network element, or (2) use more than one TTI (e.g. two TTIs) with less power but with lower MCS. One can see that for the same amount of data the second scenario will not necessarily consume less power despite the power headroom element and/or counter might lead to suppose so. That is, not each transmission on different TTIs necessarily indicate the transmission power. So, even though less power is used for transmitting on certain TTI, the number of used TTIs may be higher to send the same amount of data. Hence, overall power consumption may be different than the indicated PHR power/energy consumption.

So, basically the first transmission 310 may be used to determine path loss estimation based on the transmission energy IE 314 and measured received signal strength at the receiver. The receiver may be comprised in the network element 104 or may be separate device providing the necessary information for the network element 104 to determine the path loss. Path loss may be calculated by reducing transmission power or transmission energy indicated in the IE 314 from the measured receive signal strength (i.e. receiving energy or receiving power). Path loss may thus reveal how much energy is lost between transmitting a message from the UE to the network (e.g. network element 104). Path loss estimation may then be used to determine the transmission power or transmission energy of other messages transmitted by the UE which do not comprise the IE 314 or similar information. The path loss estimation may be stored for later use, for example. The term estimation is used to indicate that the actual path loss may change due to, for example, change in radio conditions and/or mobility of the UE.

The second transmission 320 may illustrate one example of a message (e.g. comprising header 322 and/or payload 326) which does not indicate the transmission energy. Hence, to obtain the transmission energy estimation, the network element 104 may need to use the path loss estimation and measured received signal strength of the second transmission. So, by adding the path loss estimation to the measured received signal strength, the transmission energy estimation may be acquired, i.e. estimation on how much power the UE used to transmit the second transmission 320. Accordingly, the energy estimation may be used to control/update the one or more energy counters. The second transmission 320 may comprise, for example, SRS transmission, PUCCH transmission, and/or PUSCH transmission.

According to an embodiment, the second transmission 220 does not comprise the transmission energy information element, such as the IE 314. That is, the second transmission 320 may not indicate or include the transmission energy or power used to transmit the second transmission 320. Hence, for example, upon receiving the second transmission, the network element 104 may determine the transmission energy estimation in response to detecting that the second transmission does not comprise the transmission energy information element.

Figure 4A:
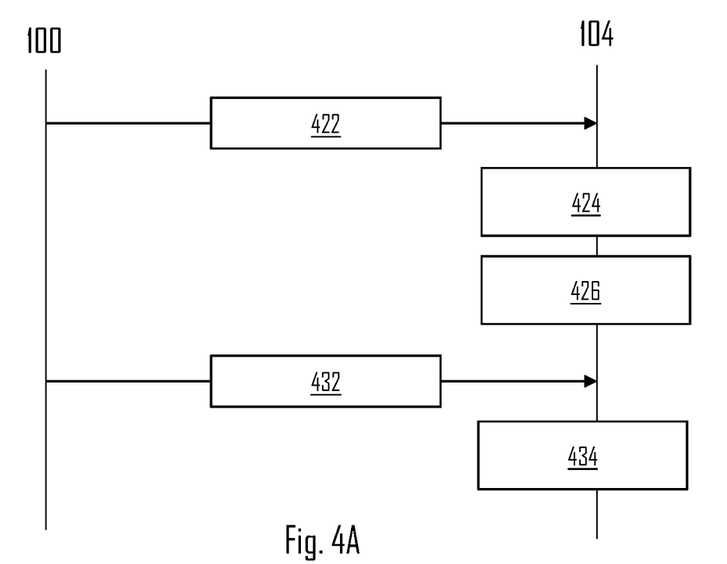
FIGS. 4A, 4B, and 4C illustrate signal diagrams according to some embodiments.
Figure 4B:
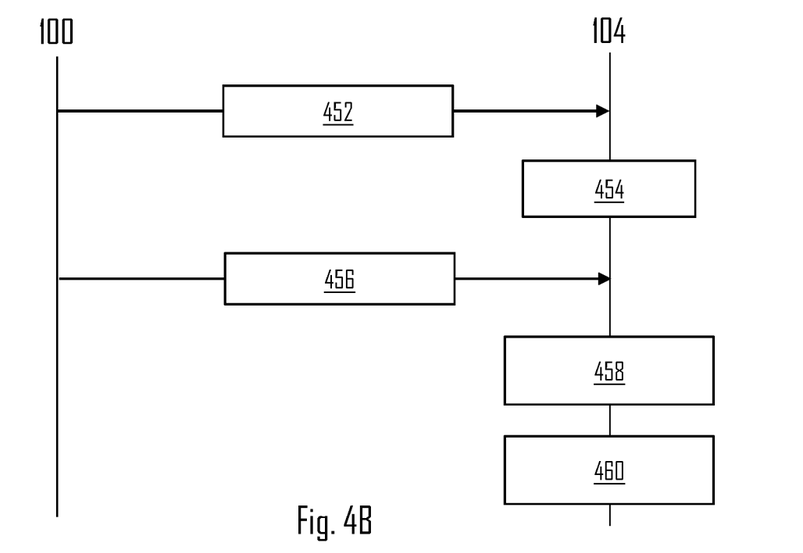
Figure 4C:
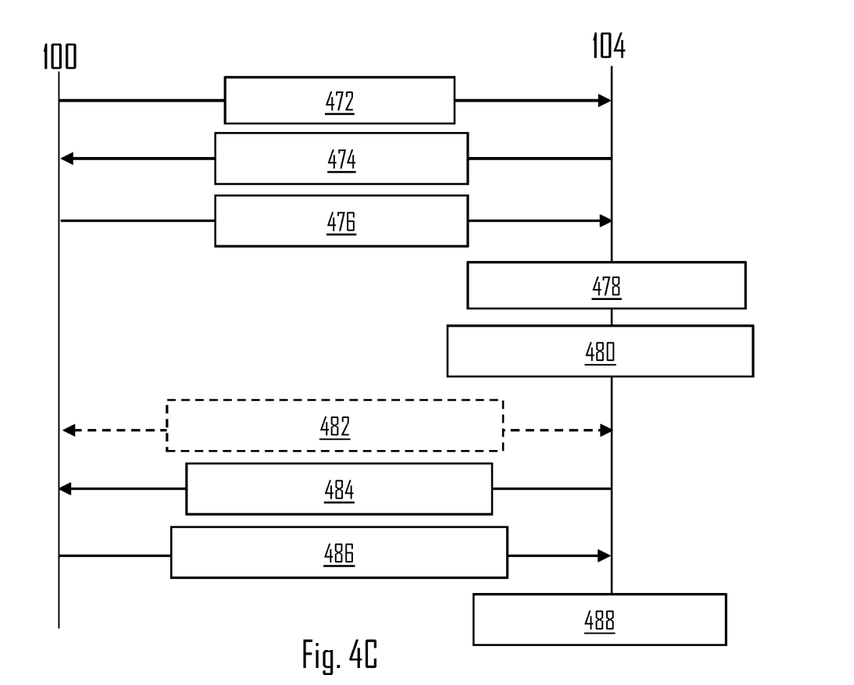

FIGS. 4A, 4B, and 4C illustrate some embodiments showing signal diagrams between the UE 100 and the network element 104. Referring to FIG. 4A, the second transmission (block 432) may be subsequent to the first transmission (block 422). Hence, the path loss estimation (block 426) may be obtained before determining the transmission energy estimation regarding the second transmission, and subsequently controlling the one or more energy counters based on the determined transmission energy estimation (block 434). In block 426, the network element 104 may further store the path loss estimation so that it may use it to determine the transmission energy estimation regarding the second transmission.

According to an embodiment, the network element 104 controls the one or more energy counters associated with the user equipment based on the transmission energy information element comprised in the first transmission (block 424). The controlling may be performed in response to receiving the first transmission in block 422. As the first transmission may comprise the IE 314, the controlling of the energy counter(s) may be based on said IE 314.

Referring to FIG. 4B, the first transmission (block 456) is subsequent to the second transmission (block 452). Hence, the network element 104 may obtain or measure and store the received signal strength (RSS) of the second transmission (block 454). This may be performed if there is no path loss estimation available regarding the UE 100. It is noted that the second transmission may not comprise the indication about the transmission energy. However, in block 456, the network element 104 may measure received signal strength of the first transmission, and in block 458 obtain the path loss estimation based on the received signal strength of the first transmission and the transmission energy information element 314 comprised in the first transmission. Further, the network element 104 may determine the transmission energy estimation regarding the second transmission based on the stored received signal strength of the second transmission and the path loss estimation. Based on the transmission energy estimation, the network element 104 may control the energy counter(s) in block 460. The network element 104 may further control the energy counter(s) based on the first transmission, and more precisely based on the IE 314 in the first transmission (e.g. in block 460). Thus, both the first and second transmissions may be taken into account in the controlling the one or more energy counters regarding the UE 100. I.e. the energy counter(s) may provide information about how much energy or power the UE 100 has used and/or is using to transmit uplink transmissions.

Referring to FIG. 4C, random access procedure is illustrated. Random access procedure may be performed to gain access to a network or networks in order to transmit data to other entities of the network(s). For this purpose, Random Access Channel (RACH) may be used by the UE. In block 472, the UE 100 transmits random access preamble to the network element 104. In block 474, the network element 104 responds to the preamble by transmitting a random access response to the UE 100. In block 476, the UE 100 transmits a connection request in response to the response message of block 474. Hence, radio admission control may commence (block 482). The network element 104 may further transmit connection setup to the UE 100 (block 484) to which the UE 100 may respond by acknowledging the setup (block 486).

As indicated in FIG. 4C, there may be, for example, three different messages or signals (i.e. transmissions) the UE 100 transmits to the network element 104. Hence, it may be beneficial to track or log how much energy is used to transmit said messages. For example, the random access preamble (block 472) may not comprise the IE 314 or similar IE which indicates the used transmission energy or power used to transmit the random access preamble. Therefore, the network element 104 may measure RSS of the received preamble and store the RSS for later use. As indicated above, the RSS may directly or via further processing indicate the received energy or received power of a received signal/message (e.g. received signal strength indicator (RSSI)). The transmission energy estimation regarding the preamble may be performed after and/or in response to acquiring the path loss estimation regarding the UE 100. In one example embodiment, the path loss estimation is acquired in block 478 in response to receiving the connection request (block 476) and measuring the RSS of the received connection request. So, for example, the connection request may comprise a MAC CE (e.g. on a PUSCH frame) carrying the power head room which then allows the calculation of the path loss estimation. Once the path loss is acquired, the network element 104 may control the energy counter(s) regarding the UE 100 based on the transmission energy estimation (obtained based on the path loss and the stored RSS) of the random access preamble (block 472). Further, the counter(s) may also be controlled based on the connection request (block 476), and more particularly based on the transmission energy IE 314 (e.g. power head room) carried by the connection request. For example, the transmission of block 472 may be the second transmission (i.e. 320) and the transmission of block 476 may be the first transmission (i.e. 310). Post the random access preamble transmission, all the uplink frames may be carried in PUSCH frames. For all of them the PUSCH way of catching the transmission energy (e.g. powerSent) may be used. If the path loss is not yet available then the RSS (e.g. powerReceived) is stored, and when the path loss has been calculated, based on a PHR in a MAC header of another frame, then powerSent can be calculated based on the stored powerReceived and the calculated path loss.

According to an embodiment, the network element 104 obtains information, from the UE 100, regarding the second transmission; determines, based on said information, a number of times the user equipment has transmitted the second transmission; and determines the transmission energy estimation regarding the second transmission further based on said number of times the user equipment has transmitted the second transmission. So, for example, if two transmission attempts are needed to successfully transmit the second transmission, the network element 104 may multiply the initially determined transmission energy estimation by two. One example of such may be shown in FIG. 4C as the random access preamble may need to be transmitted more than once before the network element 104 successfully receives it. According to an embodiment, the first transmission comprises information on how many times the second transmission has been transmitted. So, for example, the connection request (block 476) may indicate how many times the random access preamble has been transmitted. According to an embodiment, ramp up of power of the random access preamble may also need to be taken in to account determine all the power or energy that was consumed by the UE 100 in transmitting the random access preamble (block 472). Hence, the network element 104 may also take the ramp up power into account when controlling the one or more energy counters. Similar solution may also be used, for example, in FIG. 4B and/or in 4A.

In an embodiment, the number of transmission attempts of the second transmission is indicated in a different transmission (i.e. different than the first and second transmissions).

In an embodiment, the number of transmission attempts of the second transmission is indicated in the second transmission.

In an embodiment, the number of transmission attempts of the second transmission is indicated in the first transmission.

Figure 5:
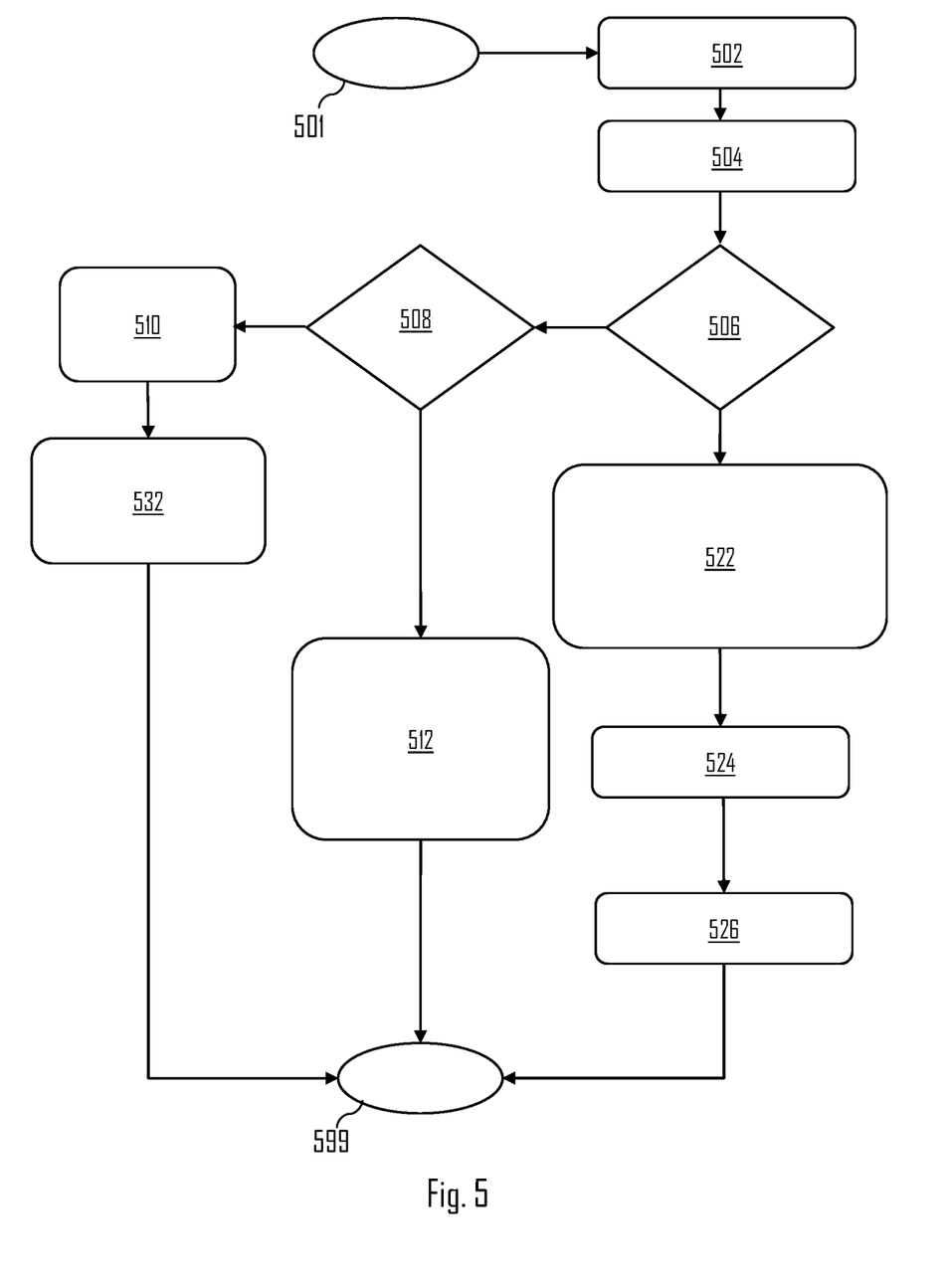
FIG. 5 illustrates a flow diagram according to one or more embodiments.

FIG. 5 illustrates a flow diagram according to some embodiments. In the Figure, different examples of how energy counter(s) are updated are shown. In block 502, the UE 100 may perform a transmission and in block 504 the network element 104 may obtain and/or measure RSS of the transmission.

In block 506, the network element 104 may determine whether the transmission indicates transmission energy (e.g. comprises IE 314) of the transmission. If not (i.e. does not indicate), process may continue to block 508. If yes (i.e. does indicate), the process may continue to block 522.

In block 522, the network element 104 may control the one or more energy counters regarding the UE 100 based on the indicated transmission energy in the transmission. Basically, for example, the indicated transmission power or energy may be directly cumulated into an energy counter.

Further, concurrently, after or before block 522, the network element 104 may determine path loss estimation regarding the UE 100 based on the indicated transmission energy of the transmission and the measured RSS (block 524). In block 526, the path loss estimation may be stored for later use.

According to an embodiment, the path loss estimation is obtained for the first time in block 524.

According to an embodiment, the network element 104 updates the path loss estimation based on the transmission energy IE 314 of the transmission. This may mean that there is already path loss estimation available regarding the UE 100, but as the received transmission comprises the transmission energy IE 314, the path loss estimation may be updated. If the transmission does not comprise the IE 314 or similar indicator, the path loss estimation may not be determined. In such case the RSS may be stored for later use.

In block 508 (if the transmission energy of the transmission is not indicated), the network element 104 may determine whether the path loss estimation is available. If not (i.e. is not available), the process may continue to block 510. If yes (i.e. is available), the process may continue to block 512.

In block 510, the RSS of the transmission may be stored, and once the path loss estimation is obtained from later transmission(s), the energy counter(s) may be updated based on the stored RSS and the path loss estimation (block 532).

In block 512, the energy counter(s) may be updated based on the obtained RSS and the already available path loss estimation (i.e. stored path loss estimation acquired based on earlier transmission).

Figure 6A:
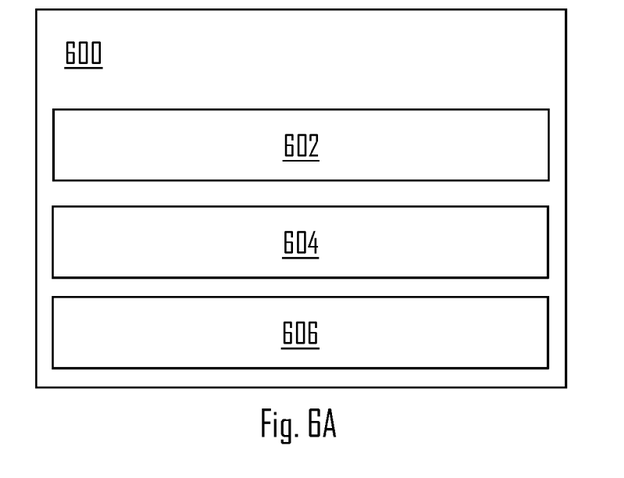
FIGS. 6A and 6B illustrate controlling of one or more energy counters according to some embodiments.
Figure 6B:
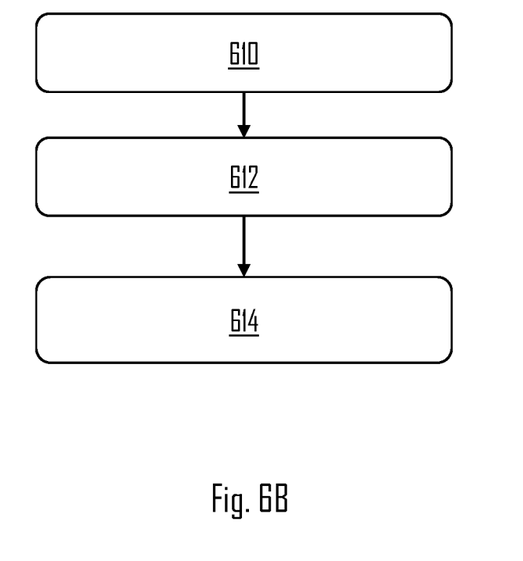

FIGS. 6A and 6B illustrate some embodiments regarding the one or more energy counters and controlling the one or more energy counters. Referring first to FIG. 6A, the one or more energy counters 600 may comprise a cumulative energy counter 602 indicating cumulated transmission energy used by the UE 100, a counter 604 indicating used energy per transmitted data by the UE 100, and/or a service counter 606 indicating used energy per service by the UE 100. As explained, the network element 104 may control and/or maintain counter(s) for plurality of UEs, wherein the counter(s) are UE specific. So, for the UE 100 there may be UE 100 specific counters 602, 604, and/or 606, and for the UE 102 there may be UE 102 specific counters 602, 604, and/or 606, for example.

The cumulative energy counter 602 may be used to store cumulative transmission energy. For example, the network element 104 may update the counter 602 by adding either obtained transmission energy from a transmission (i.e. indicated directly in the transmission) or estimated transmission energy (i.e. based on RSS and path loss) into the counter 602.

Referring to FIG. 6B, in block 610, the network element 104 may obtain estimation about amount of data transmitted by the UE 100. In block 612, the network element 104 may obtain transmission energy estimation regarding the transmitted data (e.g. used energy for one or more transmissions: said data may be transmitted using one or more transmissions). For example, this may be readily available in counter 602. The network element 104 may thus estimate how much energy or power is used to transmit the data. In block 614, the network element 104 may update the counter 604 indicating used or spent energy per data. For example, the counter 604 may indicate used or spent energy (e.g. dBm or Watts) per bit or byte. For example, the counter 604 may indicate used or spent energy per useful transmitted data (e.g. per payload).

The energy per service counter 606 may be used to store used transmission energy for a certain service. Hence, there may be more than one of such counters per UE, i.e. one counter 606 per used service. One example of a service may be a call, i.e. voice call between the UE 100 and some other UE. Hence, the network element 104 may determine the service for which the received transmission is related to or associated with, and update the energy counter of that service based on the transmission energy or transmission energy estimation of the transmission. The counter 606 may, for example, be cumulated based on transmission energy of each transmission related to that service. Hence, for example, the counter 606 may provide information on how much energy or power uplink transmissions of that service require.

In general, controlling the one or more energy counters may refer to updating the one or more energy counters. Updating may comprise at least adding the determined transmission energy into a counter (e.g. counter 602 or 606) and/or updating the energy per transmitted data counter 604. It is possible to mix the different counter, e.g. energy per service per transmitted data (e.g. how much energy is used to transmit a bit of a call). In any case, the one or more energy counters may provide useful information to enable adjustment of services and/or used communication methods.

Figure 7:
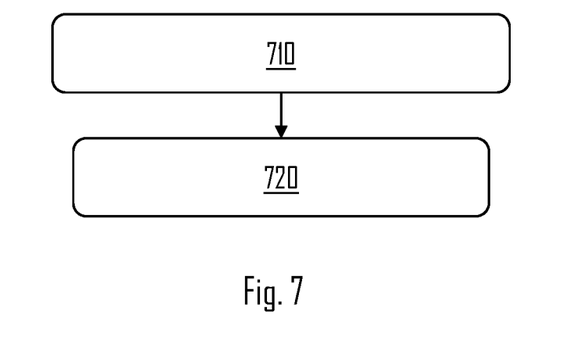
FIG. 7 illustrates an embodiment.

FIG. 7 illustrates an embodiment. Referring to FIG. 7, in block 710, the network element 104 may obtain data from the one or more energy counters 600; and perform one or more actions based on the acquire data (block 720). According to an embodiment, the one or more actions comprise causing outputting of said one or more energy counters 600 for adjusting energy consumption by the UE 100 or UEs in general. Said one or more actions may additionally or alternatively comprise configuring UE transmission power via control signaling and/or instructing the UE or UEs to use a certain communication method. For example, the UE 100 may be instructed to use a certain communication link if there is more than one communication link available in order to save battery of the UE 100. For example, the network element 104 may instruct the UE 100 to transmit some amount of data using a certain number of TTIs (e.g. two TTIs instead of one or one TTI instead of two) based on the counter information or data.

It is noted that by storing data or information about energy consumption by the UE in the counter(s) 600 may enable the UE battery and/or energy consumption to be monitored from the network side. That is, the network operator may monitor energy consumption of UEs, for example. For example, this may enable the network to better plan its overall energy consumption. That is, for example, energy savings at the network side may actually increase uplink energy consumption by UEs. Hence, such energy savings or network configurations leading to such energy savings may not be beneficial on the overall system level. Therefore, it may be beneficial to monitor the UE battery usage and/or energy consumption (e.g. uplink energy consumption) based on the methods described herein.

According to an embodiment, the second transmission 320 comprises a SRS transmission. SRS may allow the network element 104 to make measurement on the quality of the signal in uplink and also the positioning in time of the signal. So the network element 104 may then schedule efficiently the mobile. Sending SRS may require a lot of energy if the path loss is high. So, as explained above, the RSS of the SRS may be measured and the stored or later acquire path loss estimation may be used to determine how much energy the UE used to transmit the SRS(s). The counters(s) 600 may be updated accordingly.

According to an embodiment, the transmissions (e.g. second transmission 320), by the UE 100, for which the transmission energy is determined and counter(s) 600 updated comprises Acknowledgement (ACK) transmission, Non-Acknowledgement (NACK) transmission, Channel Quality Indicator (CQI) transmission, and/or Scheduling Request (SR) transmission.

According to an embodiment, the network element 104 determines a transmission energy estimation regarding each of a plurality of transmissions, by the UE 100, based on the path loss estimation and a RSS of each of the plurality of transmissions; and controls the one or more energy counters 600 associated with the UE 100 based on the determined transmission energy estimations. The network element 104 may perform similar functions for a plurality of UEs. Hence, the network element 104 may effectively update and maintain energy counters 600 regarding a plurality of UEs, wherein the counters 600 indicate and/or are updated based on uplink transmission energy or power estimates.

Accordingly, the counters 600 may comprise counters indicating uplink energy consumption per cell and/or per UE type (e.g. CAT-M or NB-IOT). Additionally or alternatively, the counters 600 may indicate maximum and/or mean energy consumption values.

Figure 8:
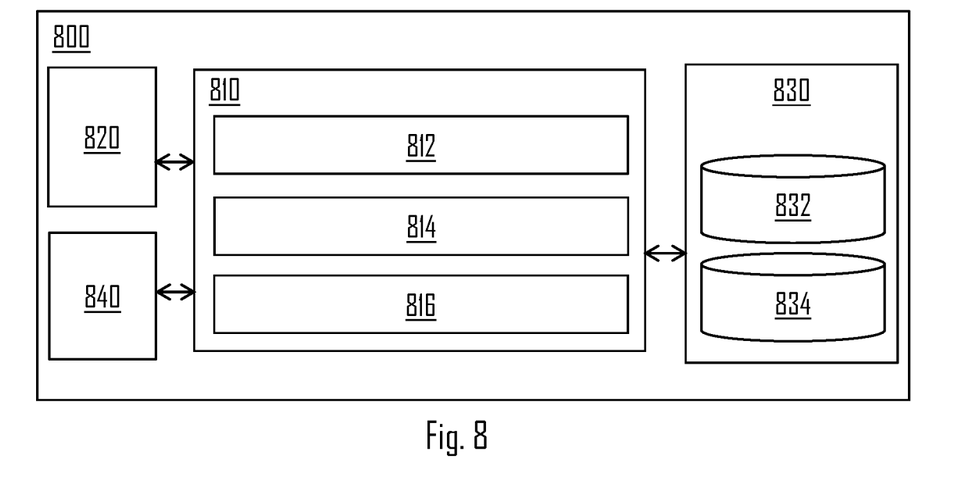
FIG. 8 illustrates a block diagram of an apparatus according to an embodiment.

FIG. 8 provides an apparatus 800 comprising a control circuitry (CTRL) 810, such as at least one processor, and at least one memory 830 including a computer program code (software) 832, wherein the at least one memory and the computer program code (software) 832, are configured, with the at least one processor, to cause the respective apparatus 800 to carry out any one of the embodiments described above, such as with reference to FIGS. 1 to 7, or operations thereof.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data. For example, the path loss estimation and/or measured RSS of transmission(s) may be stored in the database 834 from which they may be acquired once needed to calculate the transmission energy estimation regarding a transmission.

The apparatus 800 may further comprise radio interface (TRX) 820 comprising hardware and/or software for realizing communication connectivity according to one or more communication protocols. The TRX may provide the apparatus with communication capabilities to access the radio access network and enable communication between network nodes, for example. The TRX may comprise standard well-known components such as an amplifier, filter, frequency-converter, (de)modulator, and encoder/decoder circuitries and one or more antennas. The TRX may enable the apparatus to communicate with the UEs 100, 102 for example.

The apparatus 800 may also comprise user interface 840 comprising, for example, at least one keypad, a microphone, a touch display, a display, a speaker, etc. The user interface 840 may be used to control the respective apparatus by a user of the apparatus 800. For example, the user interface 840 may be used to output the data or information of the one or more energy counters 600. For example, the user interface 840 may be used to provide the information to operator of the cellular network.

In an embodiment, the apparatus 800 may be or be comprised in a base station (also called a base transceiver station, a Node B, a radio network controller, an evolved Node B, or a g Node B, for example). The apparatus 800 may be the network element 104 or comprised in the network element 104, for example.

According to an embodiment, the CTRL 810 comprises a path loss estimation circuitry 812 configured at least to cause performing operations described with respect to block 210; a transmission energy circuitry 814 configured at least to cause performing operations described with respect to block 220; and a counter controlling circuitry 816 configured at least to cause performing operations described with respect to block 230.

In an embodiment, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture, may comprise a remote control unit (RCU), such as a host computer or a server computer, operatively coupled (e.g. via a wireless or wired network) to a remote radio head (RRH) located in a base station or network element 104, for example. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

TEXT APPENDIXES FOR REFERENCE NUMBERS IN THE ATTACHED DRAWINGS

100 UE
102 UE
104 AP/DU/Relay
106 satellite
108 CU
110 CN
112 IP/Server/Data storage
114 cloud
210 obtaining path loss estimation
220 determining transmission energy estimation
230 controlling energy counter(s)
310 first transmission
312 header
314 transmission energy
316 payload
320 second transmission
322 header
326 payload
422 first transmission
424 control energy counter(s)
426 path loss estimation
432 second transmission
434 control energy counter(s)
452 second transmission
454 store RSS
456 first transmission
458 path loss estimation
460 control energy counter(s)
472 random access
474 random access response
476 connection request
478 path loss estimation
480 control energy counter(s)
482 radio admission control
484 connection setup
486 connection setup complete
488 control energy counter(s)
501 start
502 UE transmission
504 obtain RSS
506 transmission energy indicated?
508 path loss estimation available?
510 store RSS
512 control energy counter(s)
522 control energy counter(s)
524 determine path loss estimation
526 store path loss estimation
532 control energy counter(s)
599 stop
600 energy counter(s)
602 cumulative energy
604 energy per transmitted data
606 energy per service
610 obtain data estimation
612 obtain energy estimation
614 control energy counter(s)
710 obtain data from energy counter(s)
720 perform action(s) based on the data
800 apparatus
810 CTRL
812 path loss estimation circuitry
814 transmission energy circuitry
816 counter controlling circuitry
820 radio interface
830 memory
832 software
834 database
840 user interface

The invention claimed is:

1. A method in a network element, said method comprising:

obtaining a path loss estimation based on a received signal strength of a first transmission, transmitted by a user equipment, and a transmission energy information element comprised in a header of the first transmission, wherein the transmission energy information element indicates a transmission energy of the first transmission;

determining a transmission energy estimation regarding a second transmission based on the path loss estimation and a received signal strength of the second transmission; and updating one or more energy counters regarding the user equipment based on the transmission energy estimation regarding the second transmission, wherein the one or more energy counters comprise a plurality of service counters, and wherein each service counter indicates a cumulated amount of transmission energy for a plurality of transmissions for a respective service performed by the user equipment.

2. The method of claim 1, wherein the second transmission does not comprise the transmission energy information element.

3. The method of claim 1, wherein the second transmission is subsequent to the first transmission and the path loss estimation is obtained before determining the transmission energy estimation regarding the second transmission.

4. The method of claim 1, wherein the first transmission is subsequent to the second transmission, the method further comprising:

measuring and storing the received signal strength of the second transmission;

measuring the received signal strength of the first transmission and obtaining the path loss estimation based on the received signal strength of the first transmission and the transmission energy information element comprised in the first transmission; and determining the transmission energy estimation regarding the second transmission based on the stored received signal strength of the second transmission and the path loss estimation.

5. The method of claim 1, further comprising:

obtaining information, from the user equipment, regarding the second transmission;

determining, based on said information, a number of times the user equipment has transmitted the second transmission; and determining the transmission energy estimation regarding the second transmission further based on said number of times the user equipment has transmitted the second transmission.

6. The method of claim 1, further comprising:

updating the path loss estimation based on a transmission energy information element of a transmission, transmitted by the user equipment, being subsequent to the first transmission if said subsequent transmission comprises the transmission energy information element.

7. The method of claim 1, wherein the first transmission comprises a physical uplink shared channel frame.

8. The method of claim 7, wherein the physical uplink shared channel frame comprises a media access control, MAC, packet comprising the transmission energy information element.

9. The method of claim 1, wherein the one or more energy counters comprise a cumulative energy counter indicating cumulated transmission energy used by the user equipment.

10. The method of claim 1, wherein the one or more energy counters comprise a counter indicating used energy per transmitted data.

11. The method of claim 1, further comprising:

causing outputting of said one or more energy counters for adjusting energy consumption by the user equipment.

12. The method of claim 1, further comprising:

determining a transmission energy estimation regarding each of a plurality of transmissions, by the user equipment, based on the path loss estimation and a received signal strength of each of the plurality of transmissions; and controlling the one or more energy counters associated with the user equipment based on the determined transmission energy estimations.

13. A computer program product embodied on a non-transitory computer-readable medium, said computer program product comprising program instructions which, when loaded into an apparatus, execute the method according to claim 1.

14. An apparatus, comprising:

at least one processor, and at least one memory comprising computer program code, wherein the at least one memory and the computer program code are configured, with the at least one processor, to cause a network element to perform operations comprising:

obtaining a path loss estimation based on a received signal strength of a first transmission, transmitted by a user equipment, and a transmission energy information element comprised in a header of the first transmission, wherein the transmission energy information element indicates a transmission energy of the first transmission;

determining a transmission energy estimation regarding a second transmission based on the path loss estimation and a received signal strength of the second transmission; and updating one or more energy counters regarding the user equipment based on the transmission energy estimation regarding the second transmission, wherein the one or more energy counters comprise a plurality of service counters, and wherein each service counter indicates a cumulated amount of transmission energy for a plurality of transmissions for a respective service performed by the user equipment.

15. The apparatus of claim 14, wherein the second transmission does not comprise the transmission energy information element.

16. The apparatus of claim 14, wherein the second transmission is subsequent to the first transmission and the path loss estimation is obtained before determining the transmission energy estimation regarding the second transmission.

17. The apparatus of claim 14, wherein the first transmission is subsequent to the second transmission, wherein the at least one memory and the computer program code are configured, with the at least one processor, to cause the network element further to perform operations comprising:

measuring and storing the received signal strength of the second transmission;

measuring the received signal strength of the first transmission and obtaining the path loss estimation based on the received signal strength of the first transmission and the transmission energy information element comprised in the first transmission; and determining the transmission energy estimation regarding the second transmission based on the stored received signal strength of the second transmission and the path loss estimation.

18. The apparatus of claim 14, wherein the at least one memory and the computer program code are configured, with the at least one processor, to cause the network element further to perform operations comprising:

obtaining information, from the user equipment, regarding the second transmission;

determining, based on said information, a number of times the user equipment has transmitted the second transmission; and determining the transmission energy estimation regarding the second transmission further based on said number of times the user equipment has transmitted the second transmission.

19. The apparatus of claim 14, wherein the at least one memory and the computer program code are configured, with the at least one processor, to cause the network element further to perform operations comprising:

updating the path loss estimation based on a transmission energy information element of a transmission, transmitted by the user equipment, being subsequent to the first transmission if said subsequent transmission comprises the transmission energy information element.

20. The apparatus of claim 14, wherein the first transmission comprises a physical uplink shared channel frame.

21. The apparatus of claim 20, wherein the physical uplink shared channel frame comprises a media access control, MAC, packet comprising the transmission energy information element.

22. The apparatus of claim 14, wherein the one or more energy counters comprise a cumulative energy counter indicating cumulated transmission energy used by the user equipment.

23. The apparatus of claim 14, wherein the one or more energy counters comprise a counter indicating used energy per transmitted data.

24. The apparatus of claim 14, wherein the at least one memory and the computer program code are configured, with the at least one processor, to cause the network element further to perform operations comprising:

causing outputting of said one or more energy counters for adjusting energy consumption by the user equipment.

25. The apparatus of claim 14, wherein the at least one memory and the computer program code are configured, with the at least one processor, to cause the network element further to perform operations comprising:

determining a transmission energy estimation regarding each of a plurality of transmissions, by the user equipment, based on the path loss estimation and a received signal strength of each of the plurality of transmissions; and controlling the one or more energy counters associated with the user equipment based on the determined transmission energy estimations.

* * * * *